US008797300B2

(12) United States Patent
Liu et al.

(10) Patent No.: US 8,797,300 B2
(45) Date of Patent: Aug. 5, 2014

(54) METHOD FOR MEASURING DISTANCE BETWEEN COORDINATE INDICATOR AND COORDINATE INPUT DEVICE

(75) Inventors: Yingjian Liu, Beijing (CN); Songlin Wu, Beijing (CN); Guowei Xiang, Beijing (CN); Yu Tian, Beijing (CN)

(73) Assignee: Hanwang Technology Co., Ltd., Beijing (CN)

( * ) Notice: Subject to any disclaimer, the term of this patent is extended or adjusted under 35 U.S.C. 154(b) by 381 days.

(21) Appl. No.: 13/141,646

(22) PCT Filed: Sep. 16, 2009

(86) PCT No.: PCT/CN2009/073966
§ 371 (c)(1),
(2), (4) Date: Oct. 26, 2011

(87) PCT Pub. No.: WO2010/072087
PCT Pub. Date: Jul. 1, 2010

(65) Prior Publication Data
US 2012/0086633 A1    Apr. 12, 2012

(30) Foreign Application Priority Data

Dec. 22, 2008   (CN) .......................... 2008 1 0239875

(51) Int. Cl.
*G06F 3/042* (2006.01)
(52) U.S. Cl.
USPC ......................................................... 345/179
(58) Field of Classification Search
USPC .................... 345/173–178; 178/18.01–18.06, 178/19.01–19.06
See application file for complete search history.

(56) References Cited

U.S. PATENT DOCUMENTS

| 6,977,646 | B1 * | 12/2005 | Hauck et al. ................... 345/173 |
| 2007/0085836 | A1 * | 4/2007 | Ely ................................ 345/173 |
| 2008/0158176 | A1 * | 7/2008 | Land et al. ..................... 345/173 |
| 2009/0127005 | A1 * | 5/2009 | Zachut et al. ............... 178/18.03 |

FOREIGN PATENT DOCUMENTS

| CN | 1223399 | 7/1999 |
| CN | 1564193 | 1/2005 |

* cited by examiner

*Primary Examiner* — Quan-Zhen Wang
*Assistant Examiner* — Chad Dicke
(74) *Attorney, Agent, or Firm* — Jeffrey D. Myers; Peacock Myers, P.C.

(57) ABSTRACT

A method for measuring a distance between a coordinate indicator and a coordinate input device, which belongs to the technical field of computer peripheral equipments. The method comprises the steps of measuring an actual amplitude of an output signal of a receiving coil in the electromagnetic induction plate by a measurement circuit in the electromagnetic induction plate; determining a distance between the coordinate indicator and the coordinate input device in accordance with the actual amplitude of the output signal, a nominal amplitude of the output signal, and a preset reference amplitude of signal. In the present invention, the distance between the coordinate indicator and the coordinate input device is determined by converting an actual amplitude of the output signal of the receiving coil at one time to a nominal amplitude of the output signal normalized by a reference amplitude of signal, which overcomes the defect of the prior art which can not indicate a distance between the coordinate indicator and the coordinate input device.

7 Claims, 2 Drawing Sheets

METHOD FOR MEASURING DISTANCE BETWEEN COORDINATE INDICATOR AND COORDINATE INPUT DEVICE

BACKGROUND OF THE INVENTION

1. Field of Invention

The present invention relates to an input device which is one of computer peripheral equipments, in particular, to a method for measuring position information of a coordinate indicator, and more particularly, to a coordinate input device and a method for measuring a distance between a coordinate indicator and a coordinate input device.

2. Description of Prior Art

A coordinate input device and a coordinate indicator are typically used as one of the computer peripheral equipments, which work by arranging a plurality of transmit coils, which are used for intermittently transmitting electromagnetic signals to a resonating circuit in the coordinate indicator, laterally in the coordinate input device. Meanwhile, a plurality of receiving coils are arranged in the coordinate input device. The receiving coils receive the electromagnetic signals transmitted by the transmit coils and sensed by the resonating circuit. The coordinate input device sends a pressure level being applied thereto and an coordinate information about the position of the coordinate indicator on the coordinate input device to a computer. The computer determines movement track of the coordinate indicator on the coordinate input device by using relevant software, for the purpose of information input such as text input or drawing.

The process for determining the coordinate information about the position of the coordinate indicator on the coordinate input device is as follows.

At one time, the plurality of coils in a set of transmit coils in the coordinate input device are conducted in sequence and transmit signals. The coordinate indicator induces the transmitted signals and transmits sensed signals back. One of the receiving coils in the set of receiving coils in the coordinate input device is then conducted and receives the sensed signals, and then the next one does. An abscissa of the coordinate indicator is thus determined in accordance with the signal intensity of the electromagnetic signals received by the receiving coils. One of the transmit coils in a set of transmit coils in the coordinate input device is conducted and transmit signals. The coordinate indicator induces the transmitted signals and transmits sensed signals back. The plurality of coils in a set of transmit coils in the coordinate input device are then conducted in sequence and receive the sensed signals. A vertical coordinate of the coordinate indicator is thus determined in accordance with the signal intensity of the electromagnetic signals received by the receiving coils.

However, the above method can not determine a distance between the coordinate indicator and the coordinate input device, though it determines the position coordinate information about the coordinate indicator in a two-dimensional plane of the coordinate input device.

SUMMARY OF THE INVENTION

The technical problem to be solved by the present invention is to provide a method for measuring a distance between a coordinate indicator and a coordinate input device, so as to overcome the defect of the prior art which can not indicate a distance between the coordinate indicator and the coordinate input device.

To solve the above technical problem, the present invention provides a method for measuring a distance between a coordinate indicator and a coordinate input device. The coordinate input device is provided with an electromagnetic induction plate. The method comprises:

measuring an actual amplitude of an output signal of a receiving coil in the electromagnetic induction plate by a measurement circuit in the electromagnetic induction plate;

determining a distance between the coordinate indicator and the coordinate input device in accordance with the actual amplitude of the output signal, a nominal amplitude of the output signal, and a preset reference amplitude of signal.

Preferably, the method comprises measuring a nominal amplitude of the output signal;

sending the measurement signal from a slave controller in the electromagnetic induction plate to a receiving coil;

measuring a magnification factor of the receiving coil by the measurement circuit in accordance with the measurement signal;

measuring a nominal amplitude of the output signal which corresponds to the magnification factor by the measurement circuit in accordance with the measurement signal and the magnification factor.

Preferably, the method comprises presetting a reference amplitude of signal in accordance with the nominal amplitude of the output signal.

Preferably, the step of sending the measurement signal from the slave controller to the receiving coil comprises: sending the measurement signal from the slave controller to the receiving coil through a damping circuit, the amplitude of which corresponds to the actual amplitude of the output signal received by the receiving coil when the coordinate indicator performs a track input on the coordinate input device.

Preferably, the actual amplitude of the output signal and the nominal amplitude of the output signal are obtained with the same magnification factor.

Preferably, the actual amplitude of the output signal and the reference amplitude of signal are each an actual amplitude of a voltage signal, and the reference amplitude of signal is a reference amplitude of a voltage signal.

Preferably, the distance between the coordinate indicator and the coordinate input device is in a linear relationship with the actual amplitude of the output signal.

Preferably, the distance between the coordinate indicator and the coordinate input device is determined by the product of an actual amplitude of the output signal and a ratio between a reference amplitude of signal and a nominal amplitude of the output signal.

To solve the above technical feature, the present invention provides a coordinate input device, comprising: a master controller, a slave controller, a signal generator, a damping circuit, a second analog multiplexer, transmit coils, receiving coils, a first analog multiplexer, a gain control circuit, and a measurement circuit. In the coordinate input device, the slave controller controls the signal generator, the second analog multiplexer to excite the transmit coil in accordance with an instruction from the master controller so as to transmit an electromagnetic signal, and to transmit a measurement signal to the receiving coil so as to determine a nominal amplitude of the output signal of the receiving coil. The damping circuit is used for controlling an amplitude of the measurement signal so that the amplitude of the measurement signal corresponds to an actual amplitude of the output signal of the receiving coil. The measurement circuit is used for determining a nominal amplitude of the output signal of the receiving coil in accordance with the measurement signal, and measuring an actual amplitude of the output signal of the receiving coil through the first analog multiplexer and the gain control circuit. The master controller is used for adjusting an actual amplitude of the output signal of the receiving coil by the gain control circuit, and setting a reference amplitude of signal in accordance with a nominal amplitude of the output signal of the receiving coil. In the present invention, the distance between the coordinate indicator and the coordinate input device, i.e. a height that the coordinate indicator is separated from the coordinate input device, is measured by converting an actual amplitude of the output signal of the receiving coil to an amplitude of signal normalized by a reference amplitude of signal.

LIST OF REFERENCE SIGNS

Figure 1:
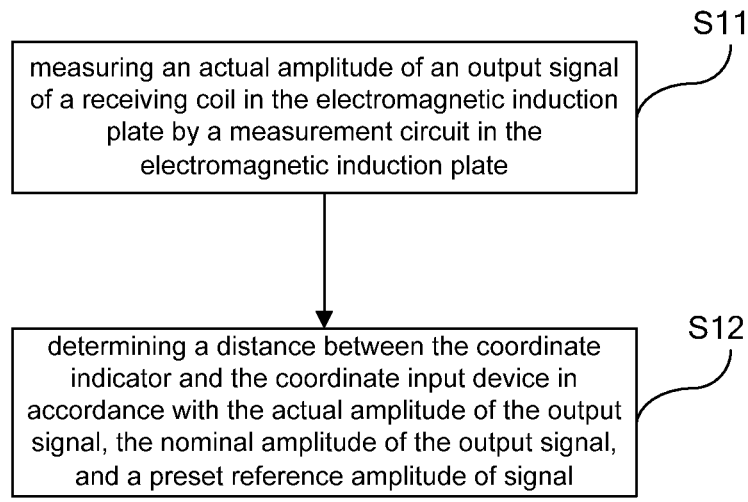
FIG. 1 shows a flowchart of the method for measuring a distance between a coordinate indicator and a coordinate input device according to the present invention.

1—coordinate input device;
10—a set of receiving coils
11—first analog multiplexer
12—gain control circuit
13—measurement circuit
14—master controller
15—slave controller
16—signal generator
17—second analog multiplexer
18—a set of transmit coils
19—damping circuit

DETAILED DESCRIPTION OF PREFERRED EMBODIMENTS

The technical solutions according to the embodiments of the present invention will be described in detail in connection with the attached drawings.

When a coordinate indicator moves above a coordinate input device, a measurement circuit measures an electromagnetic signal generated by the coordinate indicator, which electromagnetic signal is controlled by a gain control circuit so that the electromagnetic signal is always within a measurement range of the measurement circuit. Consequently, the amplitude of the electromagnetic signal measured by the measurement circuit varies in saltatory manner among different gain adjustment ranges. It will be described in detail by illustrating variation of the electromagnetic signal received by the receiving coil disposed in the coordinate input device.

When the coordinate indicator moves away from the coordinate input device, a distance between the transmit coils and the receiving coils in the coordinate input device and the resonating circuit in the coordinate indicator will be larger and larger, and an electromagnetic signal intensity received by the receiving coils from the resonating circuit will be smaller and smaller. When the coordinate indicator moves away from the coordinate input device, the signal intensity is changed to be smaller than a lower limit of the measurement circuit, the master controller increases the signal gain by the gain control circuit so as to amplify the amplitude of the output signal of the receiving coils and ensure that the amplified signal is still with the measurement range of the measurement circuit.

When the coordinate indicator approaches the coordinate input device, a distance between the transmit coils and the receiving coils in the coordinate input device and the resonating circuit will be smaller and smaller, and an electromagnetic signal intensity received by the receiving coils from the resonating circuit will be larger and larger. When the coordinate indicator moves towards the coordinate input device, the signal intensity is changed to be larger than an upper limit for the measurement circuit, the master controller decreases the signal gain by the gain control circuit so as to reduce the amplitude of the output signal of the receiving coils and ensure that the amplified signal is still with the measurement range of the measurement circuit.

It is apparent from the above discussion that an amplitude of the signal measured by the measurement circuit varies in a saltatory manner among different gain adjustment ranges, but not monotonous.

In the following embodiments of the present invention, the coordinate input device is provided with an electromagnetic induction plate. A nominal amplitude of the output signal of the receiving coils in the electromagnetic induction plate provides monotonous variation of the signal among different gain adjustment ranges for the measurement circuit.

FIG. 1 shows a flowchart of the method for measuring a distance between a coordinate indicator and a coordinate input device according to the present invention. As shown in FIG. 1, when a coordinate indicator performs a track input on a coordinate input device, a method for measuring a distance between the coordinate indicator and the coordinate input device comprises:

step S11: measuring an actual amplitude of an output signal of a receiving coil in the electromagnetic induction plate by a measurement circuit in the electromagnetic induction plate;

when the coordinate indicator performs a track input on the electromagnetic induction plate, the slave controller controls the signal generator, the second analog multiplexer to excite the transmit coil in accordance with an instruction from the master controller, so as to transmit an electromagnetic signal to the receiving coil. The electromagnetic signal is induced by the resonating circuit in the coordinate indicator and then sent back to the receiving coil in the electromagnetic induction plate. The receiving coil receives the electromagnetic signal sent back from the resonating circuit in the coordinate indicator. The electromagnetic signal is routed by the first analog multiplexer and subjected to the gain adjustment by the gain control circuit. The master controller controls the gain control circuit to adjust an output signal of the first analog multiplexer unremittingly, so that the coordinate indicator is always within a sensing range of the receiving coil in the electromagnetic induction plate. The measurement circuit measures an actual amplitude of the output signal of the receiving coil through the first analog multiplexer and the gain control circuit.

Figure 2:
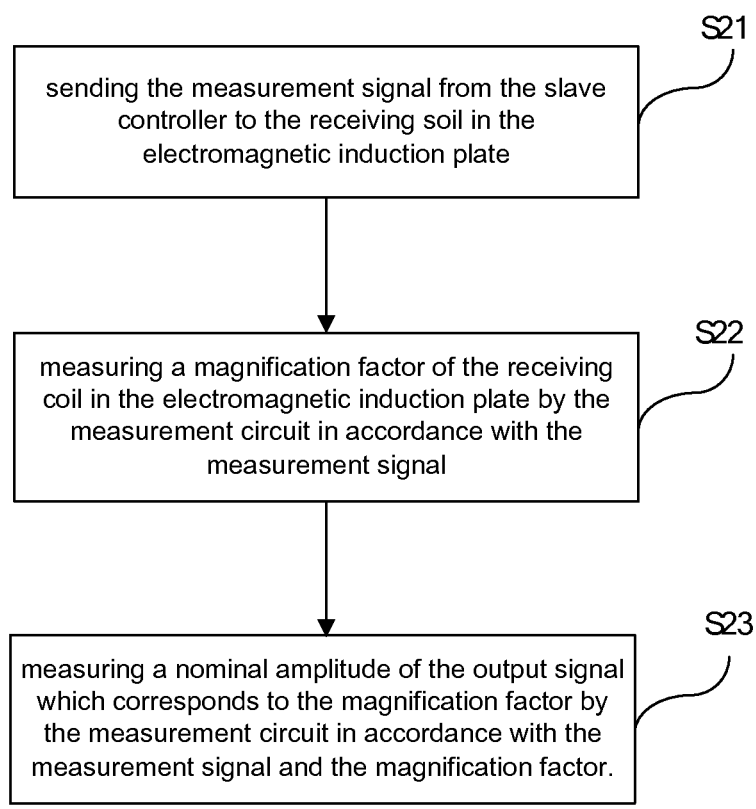
FIG. 2 shows a flowchart of measuring a nominal amplitude of an output signal.

In the present embodiment, it also includes a step of measuring a nominal amplitude of the output signal. FIG. 2 shows a flowchart of measuring a nominal amplitude of an output signal. As shown in FIG. 2, the step of measuring a nominal amplitude of the output signal comprises:

S21: sending the measurement signal from the slave controller to the receiving coil in the electromagnetic induction plate;

In this step, the measurement signal is sent from the slave controller to the receiving coil through the damping circuit, so that the amplitude of the measurement signal corresponds to the actual amplitude of the output signal received by the receiving coil when the coordinate indicator performs a track input on the coordinate input device.

Here, the measurement signal corresponds to the electromagnetic signal sent from the resonating circuit in the coordinate indicator to the receiving coil when the coordinate indicator performs a track input on the coordinate input device.

S22: measuring a magnification factor of the receiving coil in the electromagnetic induction plate by the measurement circuit in accordance with the measurement signal;

S23: measuring a nominal amplitude of the output signal which corresponds to the magnification factor by the measurement circuit in accordance with the measurement signal and the magnification factor.

In the present embodiment, the receiving coil has 8-level gain. The corresponding magnification factors are G1, G2, G3, G4, G5, G6, G7, G8, from largest to smallest. The nominal amplitudes of the output signal measured by the measurement circuit are A1, A2, A3, A4, A5, A6, A7, A8, which correspond to the 8-level magnification factor, from largest to smallest.

S12: determining a distance between the coordinate indicator and the coordinate input device in accordance with the actual amplitude of the output signal, the nominal amplitude of the output signal, and a preset reference amplitude of signal.

In the present embodiment, the distance between the coordinate indicator and the coordinate input device is in a linear relationship with the actual amplitude of the output signal. The linear relationship is used for determining the distance between the coordinate indicator and the coordinate input device. The linear relationship is determined by the product of an actual amplitude of the output signal and a ratio between a reference amplitude of signal and a nominal amplitude of the output signal. Specifically, the step of determining the distance between the coordinate indicator and the coordinate input device comprises: determining the distance between the coordinate indicator and the coordinate input device in accordance with the equation $P'=(A_s/A_i)*P_i$ .wherein, $A_s$ denotes a reference amplitude of a preset signal set by the master controller in accordance with a nominal amplitude of the output signal; $P_i$ denotes an actual amplitude of the output signal of the receiving coil which is measured by a measurement circuit when a coordinate indicator performs a track input on a coordinate input device. The actual amplitude of the output signal means an amplitude of the signal after being processed by a first analog multiplexer and a gain control circuit. $A_i$ denotes a nominal amplitude of the output signal of the receiving coil in response of the measurement signal sent by a slave controller. The actual amplitude $P_i$ of the output signal and the nominal amplitude $A_i$ of the output signal are obtained with the same magnification factor.

In the present embodiment, a distance between a coordinate indicator and a coordinate input device is determined in such a manner that there is no saltatory variation of an actual amplitude of the output signal of a receiving coil when the signal gain is adjusted among different magnification factors. After measuring a nominal amplitude of an output signal, a master controller presets a reference amplitude of signal in accordance with the nominal amplitude of the output signal. The reference amplitude of signal can be the one selected from the nominal amplitudes of the output signal which correspond to the respective magnification factors of the receiving coil. By doing so, when the receiving coil receives electromagnetic signal variation, the electromagnetic signal variation is normalized by a master controller to a nominal amplitude of the output signal. For example, the nominal amplitude A1 of the output signal, which corresponds to the magnification factor G1 in the 8-level magnification factor of G1, G2, G3, G4, G5, G6, G7, G8, is used as a reference amplitude of signal. At one time, the magnification factor of a receiving coil decreases due to the change of the distance between the coordinate indicator and the coordinate input device. To ensure that the signal is within a sensing range of the measurement circuit, the magnification factor G1, which corresponds to the nominal amplitude A1 of the output signal, should decrease to be the magnification factor G2, which corresponds to the nominal amplitude A2 of the output signal. An actual amplitude P2 of the output signal of the receiving signal, when the magnification factor is G2, is measured in the step 11. The actual amplitude P2 of the output signal of the receiving coil, when a nominal amplitude of the output signal is A2, is converted by using the equation $P'=(A_s/A_i)*P_i$ so as to obtain a distance between the coordinate indicator and the coordinate input device.

In the present embodiment, the actual amplitude of the output signal can be an actual amplitude of a voltage signal. The reference amplitude of signal can be a reference amplitude of a voltage signal.

In the present invention, the distance between the coordinate indicator and the coordinate input device is determined by converting an actual amplitude of the output signal of the receiving coil to an amplitude of signal normalized by a reference amplitude of signal, which overcomes the defect of the prior art which can not indicate a distance between the coordinate indicator and the coordinate input device.

Figure 3:
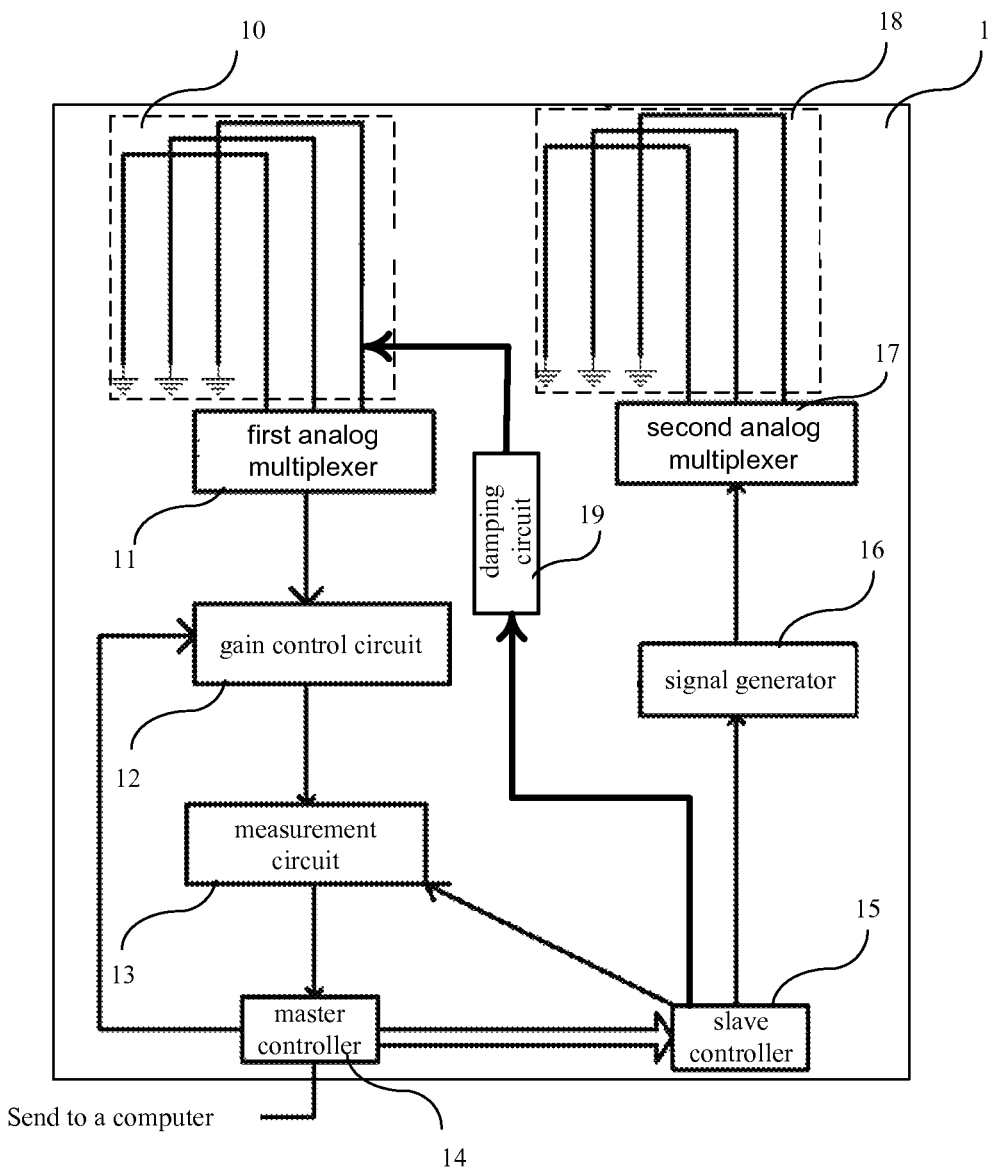
FIG. 3 is a schematic view of the coordinate input device according to the present invention.

FIG. 3 is a schematic view of the coordinate input device according to the present invention. As shown in FIG. 3, a coordinate input device 1 comprises for example a set of receiving coils 10, a first analog multiplexer 11 which is connected to the set of receiving coils 10, a gain control circuit 12 which is connected to the first analog multiplexer 11, a measurement circuit 13 which is connected to the gain control circuit 12, a master controller 14 which is connected to the measurement circuit 13, a slave controller 15 which is connected to the master controller 14, a signal generator 16 which is connected to the slave controller 15, a second analog multiplexer 17 which is connected to the signal generator 16, a set of transmit coils 18 which are connected to the second analog multiplexer 17, and a damping circuit 19 which is connected to the slave controller 15. The slave controller 15 is connected to the measurement circuit 13. The slave controller 15 controls the signal generator 16, the second analog multiplexer 17 to excite the set of transmit coils 18 in accordance with an instruction from the master controller 14 so as to intermittently transmit an electromagnetic signal, and synchronizes the phase of an electromagnetic signal received by the set of receiving signals 10 to the phase of a signal generated by the signal generator 16.

To detect a nominal amplitude of the output signal of the receiving coil 10 and determine a reference amplitude of signal in accordance with the nominal amplitude of the output signal, the master controller 14 controls the slave controller 15 to send a measurement signal to the receiving coil 10. The measurement signal simulates an electromagnetic signal received by the receiving coil 10 when the coordinate indicator approaches or moves away from the coordinate input device 11. The details about how to determine a reference amplitude of signal will be as mentioned above.

When determining a distance between the coordinate indicator and the coordinate input device, the master controller 14 sends information about a nominal amplitude of the output signal of the receiving coil, an actual amplitude of the output signal and a preset reference amplitude of signal to a computer, a software is executed in the computer so as to determine the distance between the coordinate indicator and the coordinate input device.

The invention claimed is:

1. A method for measuring a distance between a coordinate indicator including a resonating circuit and a coordinate input device provided with an electromagnetic induction plate including a transmit coil and a receiving coil, comprising:

measuring an actual amplitude of an output signal of the receiving coil in the electromagnetic induction plate by a measurement circuit in the electromagnetic induction plate when the coordinate indicator performs a track input on the coordinate input device with a distance existing between the coordinate indicator and the coordinate input device, wherein the receiving coil outputs the output signal when it receives an electromagnetic signal that is transmitted by the transmit coil and then sensed and sent back by the resonating circuit of the coordinate indicator;

selecting a nominal amplitude for the output signal from preset nominal amplitudes corresponding to preset magnification factors of the receiving coil, wherein the selected nominal amplitude for the output signal corresponds to one of the preset magnification factors in accordance with the actual amplitude of the output signal;

setting a reference signal amplitude as the selected nominal amplitude;

sending a measurement signal from the electromagnetic induction plate to the receiving coil, wherein the measurement signal simulates an electromagnetic signal received by the receiving coil when the coordinate indicator approaches or moves away from the coordinate input device;

selecting one of the preset magnification factors of the receiving coil in accordance with the amplitude of the measurement signal;

selecting one of the preset nominal amplitudes corresponding to the selected magnification factor as a nominal amplitude for the measurement signal; and determining the distance between the coordinate indicator and the coordinate input device in accordance with the actual amplitude of the output signal, the nominal amplitude for the measurement signal, and the set reference signal amplitude.

2. The method according to claim 1, wherein sending a measurement signal to the receiving coil comprises sending the measurement signal from a slave controller in the electromagnetic induction plate to the receiving coil through a damping circuit in the electromagnetic induction plate, so that the amplitude of the measurement signal corresponds to the actual amplitude of the output signal output by the receiving coil.

3. The method according to claim 1, wherein the actual amplitude of the output signal and the nominal amplitude for the output signal correspond to the same magnification factor.

4. The method according to claim 1, wherein the actual amplitude of the output signal is an actual amplitude of a voltage signal, and the reference signal amplitude is a reference amplitude for a voltage signal.

5. The method according to claim 1, wherein the distance between the coordinate indicator and the coordinate input device is in a linear relationship with the actual amplitude of the output signal.

6. The method according to claim 5, wherein the distance between the coordinate indicator and the coordinate input device is determined by the product of an actual amplitude of the output signal and a ratio between the reference signal amplitude and the nominal amplitude for the measurement signal.

7. A coordinate input device, comprising a master controller, a slave controller, a signal generator, a damping circuit, a second analog multiplexer, transmit coils, receiving coils, a first analog multiplexer, a gain control circuit and a measurement circuit, wherein the slave controller is configured to control the signal generator and the second analog multiplexer to excite a transmit coil in accordance with an instruction from the master controller, the transmit coil is excited to transmit an electromagnetic signal, and the receiving coil is configured to receive the electromagnetic signal sensed and sent back from a coordinate indicator and output an output signal;

the measurement circuit is configured to measure an actual amplitude of the output signal of the receiving coil which have passed through the first analog multiplexer and the gain control circuit, the actual amplitude of an output signal of the receiving coil being measured when the coordinate indicator performs a track input on the coordinate input device with a distance existing between the coordinate indicator and the coordinate input device;

the slave controller is further configured to transmit a measurement signal to the receiving coil, wherein the measurement signal simulates an electromagnetic signal received by the receiving coil when the coordinate indicator approaches or moves away from the coordinate input device, one of preset nominal amplitudes corresponding to a plurality of preset magnification factors of the receiving coil is selected in accordance with an amplitude of the measurement signal as a nominal amplitude for the measurement signal;

the damping circuit is configured to control the amplitude of the measurement signal so that the amplitude of the measurement signal corresponds to the actual amplitude of the output signal of the receiving coil;

the measurement circuit is further configured to determine a nominal amplitude for the output signal of the receiving coil corresponding to one of the preset magnification factors of the receiving coils in accordance with the actual amplitude of the output signal; and the master controller is configured to control the gain control circuit to adjust the actual amplitude of the output signal of the receiving coil, and to set a reference signal amplitude as the determined nominal amplitude for the output signal, wherein the distance between the coordinate indicator and the coordinate input device is determined in accordance with the actual amplitude of the output signal, the nominal amplitude for the measurement signal, and the set reference signal amplitude.

* * * * *